(12) United States Patent
Newstadt et al.

(10) Patent No.: US 7,620,974 B2
(45) Date of Patent: Nov. 17, 2009

(54) DISTRIBUTED TRAFFIC SCANNING THROUGH DATA STREAM SECURITY TAGGING

(75) Inventors: Keith G. Newstadt, Newton, MA (US); David T. Lin, Arlington, MA (US); William J. Guavin, Waltham, MA (US)

(73) Assignee: Symantec, Cupertino, CA (US)

( * ) Notice: Subject to any disclaimer, the term of this patent is extended or adjusted under 35 U.S.C. 154(b) by 892 days.

(21) Appl. No.: 11/034,161

(22) Filed: Jan. 12, 2005

(65) Prior Publication Data

US 2006/0156401 A1 Jul. 13, 2006

(51) Int. Cl.
*G06F 17/00* (2006.01)
*H04L 9/00* (2006.01)
(52) U.S. Cl. .......................................... 726/1; 713/164
(58) Field of Classification Search ....................... 726/1
See application file for complete search history.

(56) References Cited

U.S. PATENT DOCUMENTS

| 5,968,176 | A | 10/1999 | Nessett et al. | |
| 6,202,157 | B1 * | 3/2001 | Brownlie et al. | 726/1 |
| 6,542,993 | B1 * | 4/2003 | Erfani | 726/1 |
| 6,971,026 | B1 * | 11/2005 | Fujiyama et al. | 726/25 |
| 7,046,680 | B1 * | 5/2006 | McDysan et al. | 370/396 |
| 7,096,260 | B1 * | 8/2006 | Zavalkovsky et al. | 709/223 |
| 7,103,914 | B2 * | 9/2006 | Focke et al. | 726/22 |
| 7,308,711 | B2 * | 12/2007 | Swander et al. | 726/13 |
| 7,318,237 | B2 * | 1/2008 | Moriconi et al. | 726/27 |
| 7,424,610 | B2 * | 9/2008 | Ranganathan | 713/164 |
| 2002/0098840 | A1 | 7/2002 | Hanson et al. | |
| 2004/0078334 | A1 * | 4/2004 | Malcolm et al. | 705/50 |
| 2006/0112431 | A1 * | 5/2006 | Finn et al. | 726/22 |

OTHER PUBLICATIONS

International Search Report for PCT/US06/00317, mailed Apr. 23, 2007.
Office Action dated Mar. 6, 2009 in corresponding Chinese Patent Application No. 200680008026.4.

* cited by examiner

*Primary Examiner*—Kambiz Zand
*Assistant Examiner*—Monjour Rahim
(74) *Attorney, Agent, or Firm*—Finnegan, Henderson, Farabow, Garrett & Dunner L.L.P.

(57) ABSTRACT

Methods and systems for providing data security scanning in a network. A network device ascertains, based on a network's security policy, security technologies that are should or must be applied to the network traffic. The network device applies the not yet applied security technologies, based on a determination that the not yet applied security technologies are available to the network device. Next, the network device tags the network traffic with a security marker indicating the not yet applied security technologies as applied to reflect the security technologies applied to the network traffic.

73 Claims, 5 Drawing Sheets

DISTRIBUTED TRAFFIC SCANNING THROUGH DATA STREAM SECURITY TAGGING

TECHNICAL FIELD

This invention relates to the field of computer network security. More particularly, the present invention relates to methods and systems for orchestrating data security scanning in a network with multiple security devices and technologies.

BACKGROUND

With the ever-increasing popularity of the Internet, particularly the World Wide Web ("Web") portion of the Internet, more and more computers are connected to networks, including Local Area Networks ("LANs") and Wide Area Networks ("WANs"). The explosive growth of the Internet has had a dramatic effect on how people communicate and engage in many business opportunities. More and more, people require access to the Internet in order to facilitate research, competitive analysis, communication between branch offices, and send e-mail, to name just a few.

As a result, corporate information technology ("IT") departments, for example, now face unprecedented challenges. Specifically, such departments, which have to date operated largely in a clearly defined and friendly environment—i.e., a private secure computer network, are now confronted with a far more complicated and hostile situation. As more and more computers are now connected to the Internet, either directly (e.g., over a dial-up connection with an Internet Service Provider or "ISP") or through a gateway between a LAN and the Internet, a whole new set of challenges face LAN administrators and individual users alike: these previously-closed computing environments are now opened to a worldwide network of computer systems. In particular, systems today are vulnerable to attacks by practically any perpetrators or hackers having access to the Internet.

For a long time, firewalls alone acted as security gateways for data that flowed through or into a network. Firewalls are applications that intercept data traffic at the gateway to a WAN, for example, and try to check the data packets (i.e. Internet Protocol packets or "IP packets") being exchanged for suspicious or unwanted activities. In addition, a firewall may intercept data traffic at a computer connected to a LAN. Initially, firewalls have been used primarily to keep intruders from the LAN by filtering packets. Gradually, firewalls have evolved to shoulder more security functions, such as scanning network traffic for protocol validity and for content. A modern firewall, acting as a network gateway, implements a wide variety of security technologies such as anti-virus ("AV"), anti-spam, protocol anomaly detection, content filtering, and intrusion detection system ("IDS"), in order to secure many different network applications. Examples of network applications include web browsers, electronic mail ("e-mail"), instant messenger ("IM"), and database access.

A modern network is likely to have multiple network devices, which includes security devices (e.g. IDS scanners, AV scanners, and e-mail scanners) and technologies deployed, and host-based security software installed on server and desktop endpoints. Depending on the route of a particular flow of network traffic, the traffic may be scanned by a particular security technology once or many times. In fact, desktop and laptop computers are taking on a large part of the burden of securing network data streams via host-based security devices such as firewalls, AV programs, spam scanners, and IDS software. This redundant scanning of network traffic places unnecessary load on burdened security devices and network hosts, and increases the likelihood of network bottlenecks or device failures.

With multiple security devices in a network to secure a particular traffic stream, ensuring that the network is securing its traffic stream efficiently becomes an issue. Currently, each device scans all traffic to its best capability, therefore traffic flowing through multiple gateways, devices, and desktops within a network may be scanned multiple times in order to ensure that the network traffic gets scanned at all. For example, a network administrator can configure an AV scanner to scan network traffic for viruses if the traffic is coming from a specific security gateway known not to scan for viruses. However, the AV scanner does not have visibility behind that gateway, and it is possible that another device behind the gateway has already scanned the traffic for viruses. Furthermore, as networks become more complex and contain more security devices, the task of effectively configuring individual devices to create secure but efficient networks becomes impossibly difficult. Consequently, in all likelihood, each security device will be configured to scan all traffic to its best capability. While this setup ensures the security of the network traffic, such setup is an inefficient of network resources.

Accordingly, there is a need for systems and methods that orchestrate data security scanning in a network comprising multiple security devices and technologies. It is desirable that such systems and methods ensure that all network traffic through and into the network is secured to the level configured by the network administrator, while sharing the burden of securing network traffic across the many devices capable of providing that security.

SUMMARY

Consistent with the principles of the present invention, a method is provided for data security scanning in a network. The method comprises acquiring a security policy of a network for network traffic being transmitted from outside the network to a destination network device; ascertaining, based on the security policy, security technologies that should or must be applied to the network traffic; and determining, based on a security marker associated with the network traffic, security technologies that are not yet applied to the network traffic.

Consistent with another embodiment, a system is provided for data security scanning in a network. The system comprises a first network device for acquiring a security policy of a network for network traffic being transmitted from outside the network to a destination network device; a second network device for ascertaining, based on the security policy, security technologies that should or must be applied to the network traffic; and a third network device for determining, based on a security marker associated with the network traffic, security technologies that are not yet applied to the network traffic.

In another embodiment consistent with the present invention, a computer-readable medium is provided containing instructions for performing a method for data security scanning in a network. The method comprises acquiring a security policy of a network for network traffic being transmitted from outside the network to a destination network device; ascertaining, based on the security policy, security technologies that should or must be applied to the network traffic; and determining, based on a security marker associated with the network traffic, security technologies that are not yet applied to the network traffic.

BRIEF DESCRIPTION OF THE DRAWINGS

Both the foregoing general description and the following detailed description are exemplary and explanatory only. They do not restrict the invention, as claimed. Furthermore, the accompanying drawings, which are incorporated in and constitute a part of this specification, illustrate one (or several) embodiments of the invention and together with the description, serve to explain the principles of the invention. In the drawings:

DETAILED DESCRIPTION

Methods and systems consistent with the present invention provide a mechanism for data security scanning in a network. A network device on a network acquires the network's security policy for network traffic being transmitted from outside the network to a destination network device. The network device ascertains, based on a security policy of the network, security technologies that should or must be applied to the network traffic. The network device determines, based on a security marker associated with the network traffic, one or more of the mandatory security technologies that have not been applied to the network traffic. The network device then applies the not yet applied security technologies, based on a determination that the not yet applied security technologies are available to the network device. Next, the network device tags the network traffic with a security marker indicating the not yet applied security technologies as applied to reflect the security technologies applied to the network traffic.

Methods and systems consistent with the present invention may also provide another mechanism for data security scanning in a network. A security device on the network receives a request from a destination network device for network traffic from outside the network. The security device or the destination network device acquires a security policy of the network for network traffic being transmitted from outside the network to the destination network device. Then, based on the security policy, the security device or the destination network device ascertains security technologies that should or must be applied to the network traffic. The security device sends a query to network devices located on an intended path of the network traffic to the destination network device, which solicits assistance offers from the one or more network devices for assistance in applying the security technologies. Based on a determination from the offers of assistance that at least one network devices has volunteered to apply the security technologies, the security device transmits the network traffic, without applying the security technologies, along the intended path of the network traffic to the destination device.

Reference will now be made in detail to present embodiments of the invention, examples of which are illustrated in the accompanying drawings. Wherever possible, the same reference numbers will be used throughout the drawings to refer to the same or like parts.

Network Device Configuration

Figure 1:
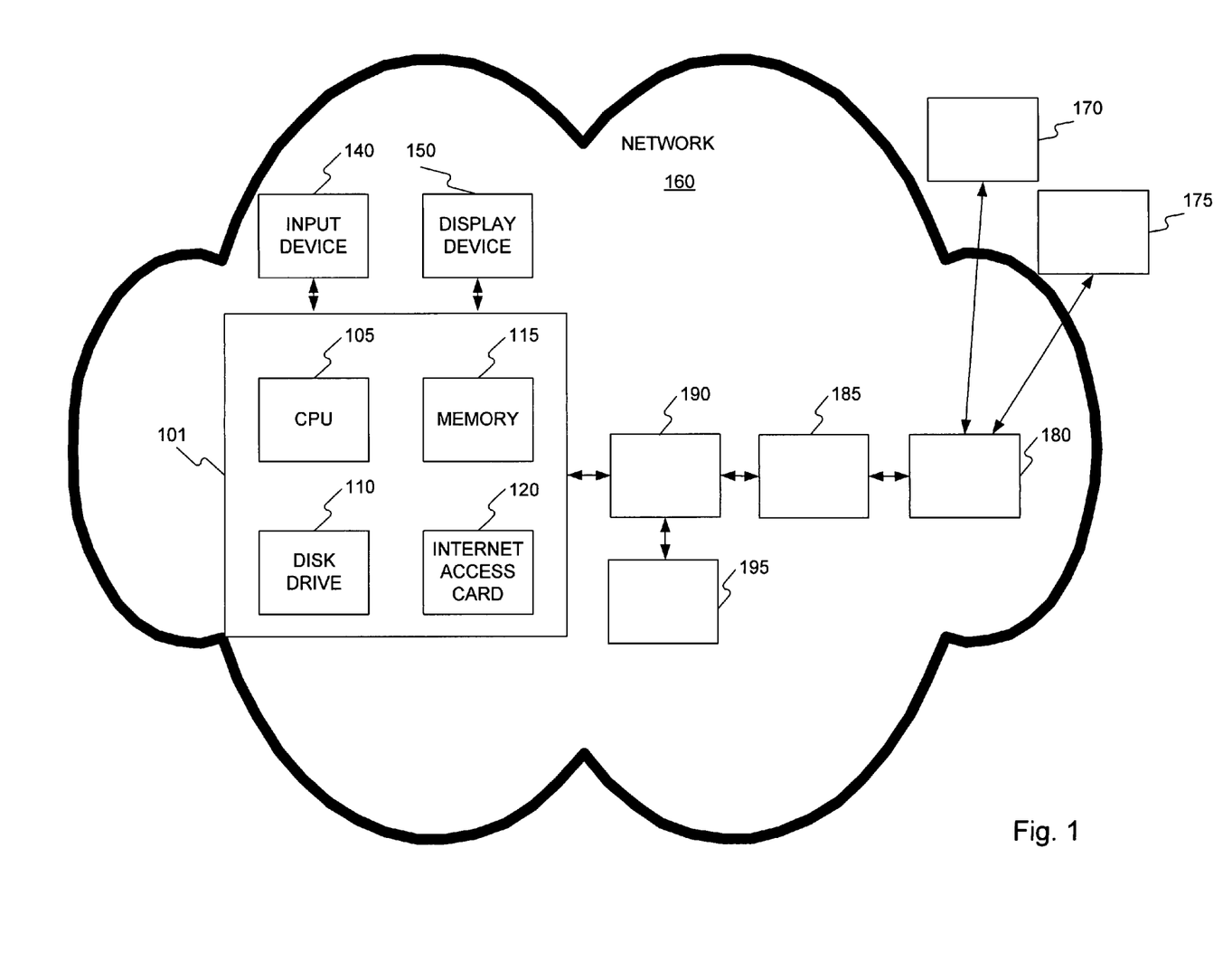
FIG. 1 is an exemplary block diagram of a system for orchestrating data security scanning in a network with multiple security devices and technologies, consistent with the principles of the present invention.

FIG. 1 is an exemplary block diagram of network devices, consistent with the principles of the present invention, for providing data security scanning in a network. Network devices 101 and 180-195 may include a central processing unit (CPU) 105, a disk drive 110, a memory 115, and a network access device 120. CPU 105 may be any appropriate processor or processors for executing program instructions. Memory 115 may be RAM or another permanent, semi-permanent, or temporary storage device, including ROM and flash memory. Disk drive 110 may be a hard disk drive, optical drive, or other type of data storage device.

Network access device 120 may be a modem, cable modem, Ethernet card, T1 line connector, or some other access device for connecting network devices 101 and 180-195 to a network 160 for communication. Network 160 may be the Internet and network devices 101 and 180-195 may connect to network 160 using a Transport Control Protocol (TCP) connection.

Each of network devices 101 and 180-195 may also be connected to one or more input devices, such as an input device 140, which may include a keyboard, mouse, or some other type of means for inputting data to network device. Each of network devices 101 and 180-195 may also be connected to one or more display devices, such as a display device 150, which may be a monitor or other visual and/or audiovisual output device.

Network 160 may be connected to multiple devices outside the network, in this case, exemplary devices 170-175. Devices 170-175 may be computers sending out network traffic, such as servers, data processing systems, email servers, or personal computers. Network 160 may also contain multiple devices, in this case exemplary network devices 101 and 180-195. Network devices 101 and 180-195 may be routers, switches, gateways, network security devices such as firewalls or AV scanners, or data processing systems such as servers, personal computers, or combinations thereof, and may receive and transport data over a communications port (not shown). Network devices 101 and 180-195 may receive data over network 160 and may each include a network access device or the like (not shown). Using a network connection, such as TCP/IP, network 160 may transmit data between network device 101, and one or more network devices 170-175 outside the network via one or more of network devices 180-195. Those skilled in the art will recognize that network device 180 may be located on the perimeter of the network 160 and connected to devices outside the network, thereby act as a perimeter security device to network 160 and network devices connected within network 160.

Software loaded into memory 115 from, for example, disk drive 110 at the direction of CPU 105 may be used to implement a data security scanner for scanning network traffic flowing through and into network device 101. One of skill in the art will recognize that a data security scanner may also be implemented in firewalls, routers, gateways, and other network architecture. The data security scanner may consist of one or a set of programs that scan the traffic flowing into and out of a network.

IP addresses identify the origin of incoming data or incoming connections to network device 101. IP addresses are numerical representations of the address of a computer in a network. In addition to being a unique identifier of a particular network device, much akin to a street address, one can often determine the physical location which corresponds to a particular IP address.

There are several ways to determine the location corresponding to a known IP address. One way is to maintain a database stored in disk drive 110. For example, the database may list IP addresses along with their corresponding physical or logical location. In addition, the database may include entries corresponding to a range of IP addresses that constitute a particular network. The locations listed in the database may include region-of-the-world information, such as country or city names, or both. Network device 101 may access such a database that resides locally on disk drive 110 to lookup an IP address of a computer initiating a data transmission to device 101. If the database includes the IP address, either individually or as part of a range of addresses, network device 101 can determine the location of a computer contacting it.

Another way for network device 101 to determine the location of an IP address is to access a database via a trusted Internet address by using network 160. Network databases are frequently updated to account for new IP addresses, and local databases may require the user to download periodic updates to the database. In order to do so, network device 101 would communicate over network 160 with one or more other network devices, such as network devices 170-175, to access the database. Other ways may be used, as will be understood by those of ordinary skill in the art.

System Operation for Avoiding Redundant Scanning

Figure 2:
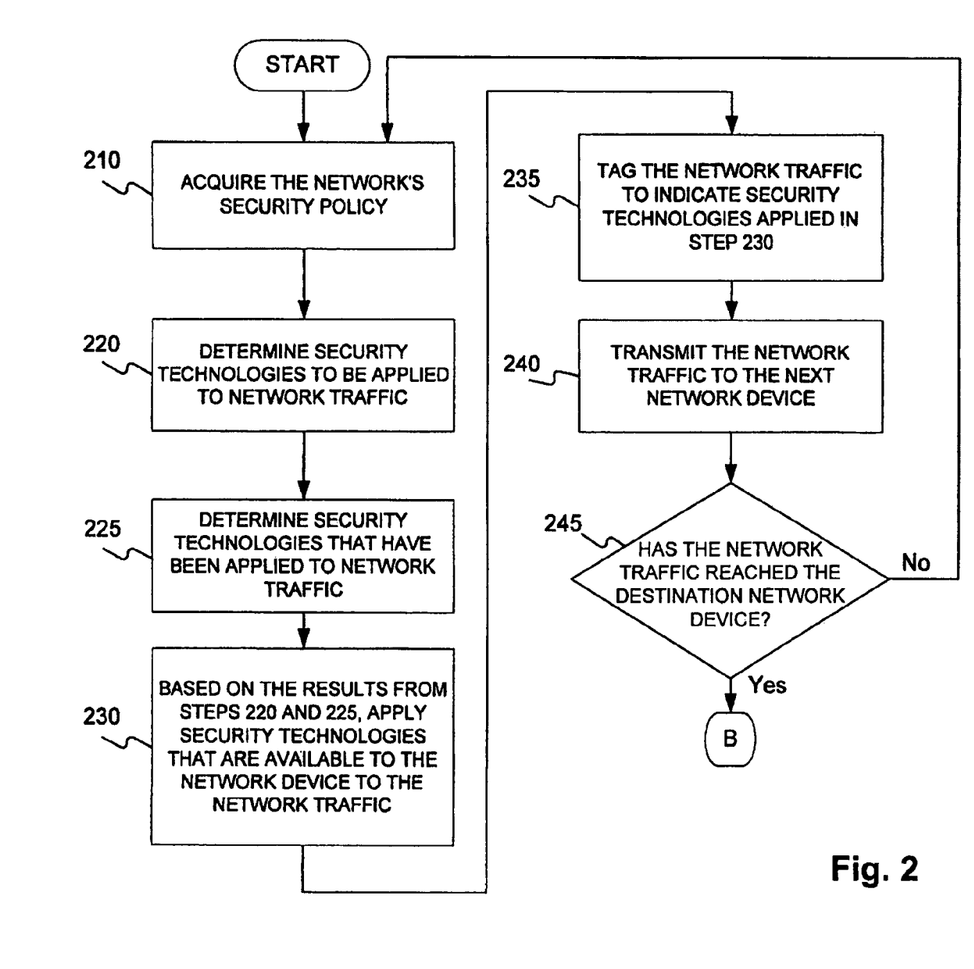
FIGS. 2 and 3 are flow diagrams for avoiding redundant data security scanning in a network comprising multiple security devices and technologies.
Figure 3:
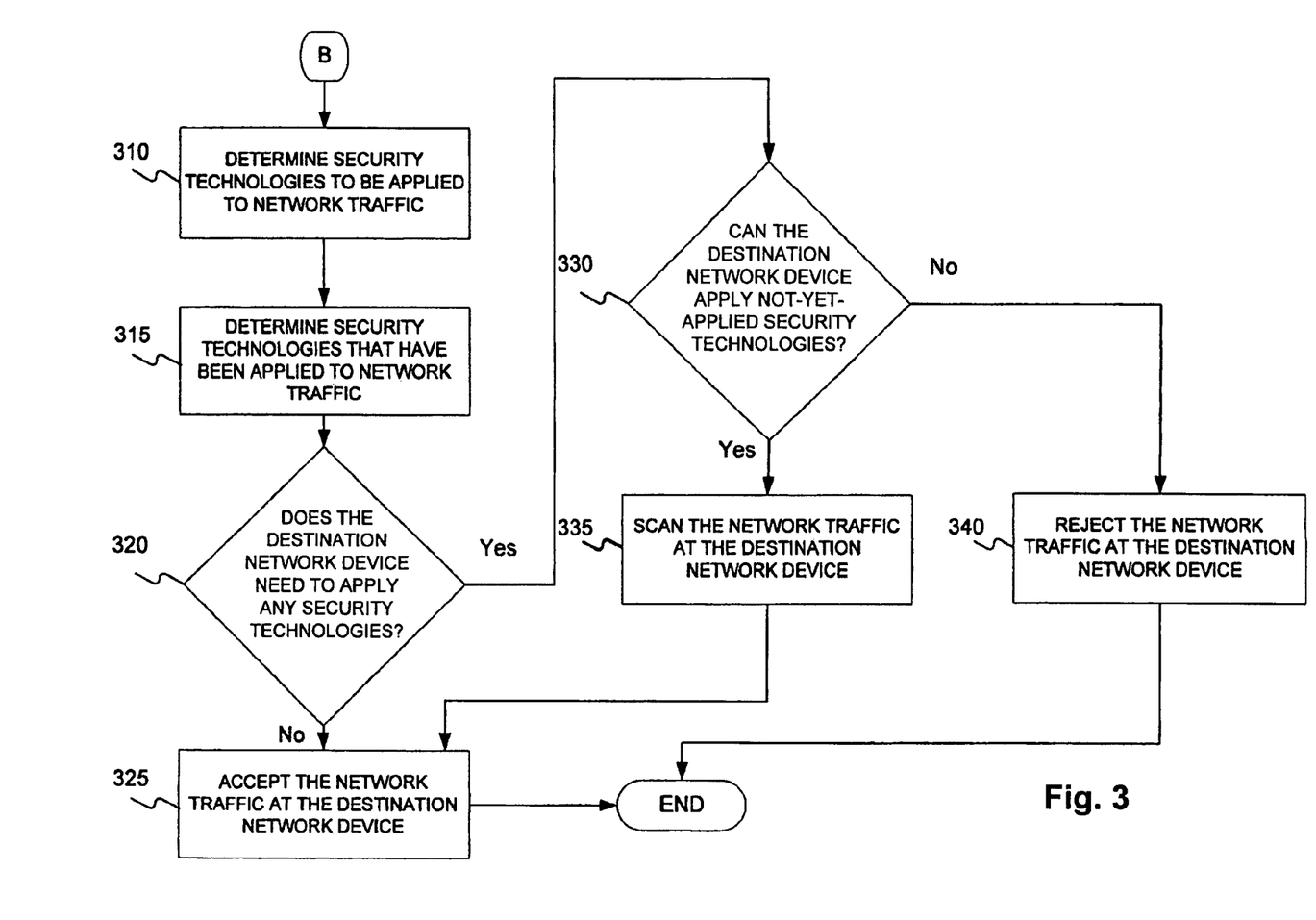

FIGS. 2 and 3 are flow diagrams of a process, consistent with the invention, for avoiding redundant data security scanning in a network comprising multiple security devices and technologies. At the start of the process as indicated in FIG. 2, a network device for providing security scanning (e.g. FIG. 1, element 180) within a network (e.g. FIG. 1, element 160) acquires the network's security policy in stage 210. This may occur, for example, at a specified time or event, such as when the network receives network traffic from a device outside the network. The network device may acquire the security policy by retrieving a copy stored in the network device's memory, or by requesting a copy of the security policy from another network device on the network. To ensure that the security policy is accurate and trustworthy and that the network stream is not corrupted, the network device or another network device on the network may verify the authenticity of the security policy and the integrity of the network traffic by, for example, utilizing a public key scheme such as PKI to check the signature or the source associated with the security policy and the network traffic.

Next, in stage 220, the network device determines from the security policy the security technologies which are to be applied to the network traffic. Examples of security technologies include AV, anti-spam, protocol anomaly detection, content filtering, and IDS. The security policy may include, for example, a list of security technologies that must or should be applied to any network traffic entering the network. After establishing the security technologies to be applied to the network traffic in stage 220, the network device, in stage 225, determines the security technologies that have already been applied to the network traffic. As an example, the network device may read a security marker associated with the network traffic to determine what security technologies have been applied to the network traffic. In one embodiment, the security marker may be placed in the header of data packets in the network traffic. The security marker may include a list of security technologies and a special packet of information (such as a hash, a public key, a digital signature, or a certificate), indicating that the network device can trust the security marker. The security marker may contain a list of the security technologies that have been applied to the network traffic. Alternatively, the security marker may contain a list of security technologies that have not been applied to the network traffic. In order to ensure that the information represented in the security marker is accurate and trustworthy and that the network stream is not corrupted, the network device may verify the authenticity of the security marker and the integrity of the network traffic by, for example, utilizing a public key scheme such as PKI to check a digital signature or the source associated with the security marker and the network traffic. If the security marker cannot be verified, such as when a digital signature for the security marker is invalid or cannot be found, then the network device may ignore the security marker and rescan the traffic according to the network's security policy.

Based on the results from stages 220-225 in which the network device determines what security technologies must or should be applied to the network traffic entering the network and what security technologies have been applied to the network traffic, the network device in stage 230 applies to the network certain traffic security technologies that are available to the network device. As stated above, if the network device is unable to verify the security marker which indicates what security technologies have been or have not been applied to the network traffic (such as when the digital signature for the security marker is invalid or cannot be found), then the network device may ignore the security marker and rescan the traffic according to the network's security policy.

In stage 235, the network device tags the network traffic to indicate the security technologies applied to the network traffic in stage 230. The network device tags the network traffic by adding a security marker if there is no security marker associated with the network traffic or by modifying the security marker associated with the network traffic if there is a security marker associated with the network traffic. The security marker may be placed in the header of data packets in the network traffic, the security marker including a list of security technologies and a special packet of information, such as a hash, a public key, a digital signature, or a certificate, indicating that the network device can trust the security marker. The security marker may contain a list of the security technologies that have been applied to the network traffic. Alternatively, the security marker may contain a list of security technologies that have not been applied to the network traffic. To ensure that the information represented in the security marker is accurate and trustworthy and that the network stream is not corrupted, the network device digitally signs the security marker and the network traffic by, for example, utilizing a public key scheme such as PKI.

In stage 240, the network device transmits the network traffic to the next network device in the network. Then, in stage 245, a determination is made whether the network traffic has reached the destination network device. If the network traffic has not reached the destination network device, then the process returns to stage 210. Alternatively, if the network traffic has reached the destination network device, the process continues to FIG. 3, stage 310.

Referring now to FIG. 3, the destination network device at stage 310 determines from the security policy what security technologies to apply to the network traffic. After establishing what security technologies to apply to the network traffic in stage 310, the destination network device determines at stage 315 what security technologies have been applied to the network traffic. For example, the destination network device may read a security marker associated with the network traffic to determine what security technologies have been applied to the network traffic. As a way to ensure that the information represented in the security marker is accurate and trustworthy and that the network stream is not corrupted, the destination network device may verify the authenticity of the security marker and the integrity of the network traffic. If the security marker cannot be verified, such as when a digital signature for the security marker is invalid or cannot be found, then the destination network device ignores the security marker and rescans the traffic according to the network's security policy.

Based on the results from stages 310-315 in which the destination network device determines what security technologies must or should be applied to the network traffic entering the network and what security technologies have been applied to the network traffic, the destination network device in stage 320 makes a determination of whether it needs to apply any not yet applied security technologies. If the destination network device does not need to apply any security technologies based on the determination made in stage 320, then the destination network device accepts the network traffic at stage 325. Otherwise, if the destination network device needs to apply not yet applied security technologies based on the determination made in stage 320, then the process continues to stage 330. In stage 330, the destination network device determines whether it can apply the not yet applied security technologies. If the destination network device is capable of applying the not yet applied security technologies, then the process proceeds to stage 335 and the destination network device scans the network traffic using the not yet applied security technologies. On the other hand, if the process in stage 330 determines that the destination network device is not capable of applying the not yet applied security technologies, then the process continues onto stage 340 and the destination network device rejects the network traffic or reroutes it to a specialized security device.

System Operation for Distributed Traffic Scanning

Figure 4:
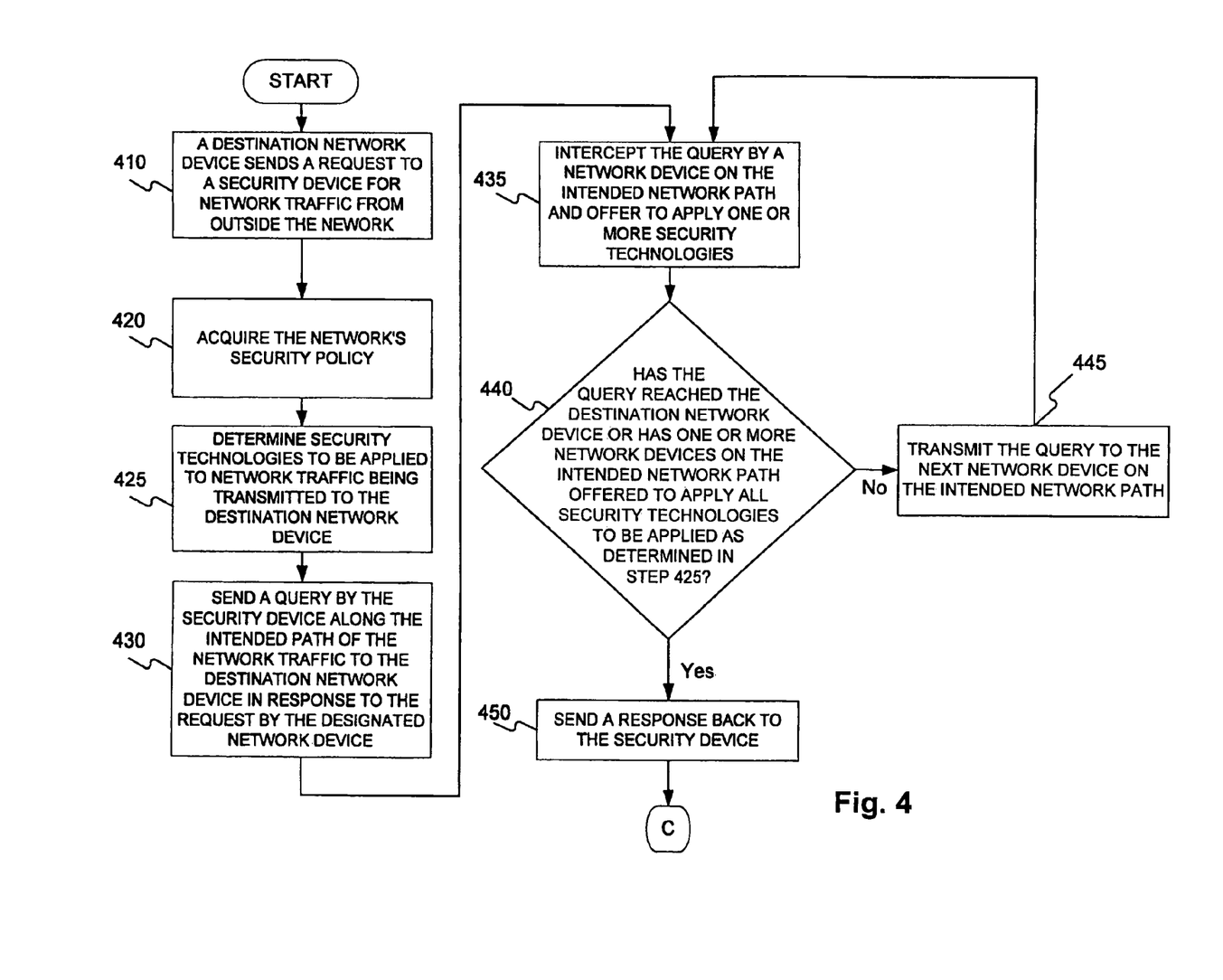
FIGS. 4 and 5 are flow diagrams for distributed network traffic scanning in a network comprising multiple security devices and technologies.
Figure 5:
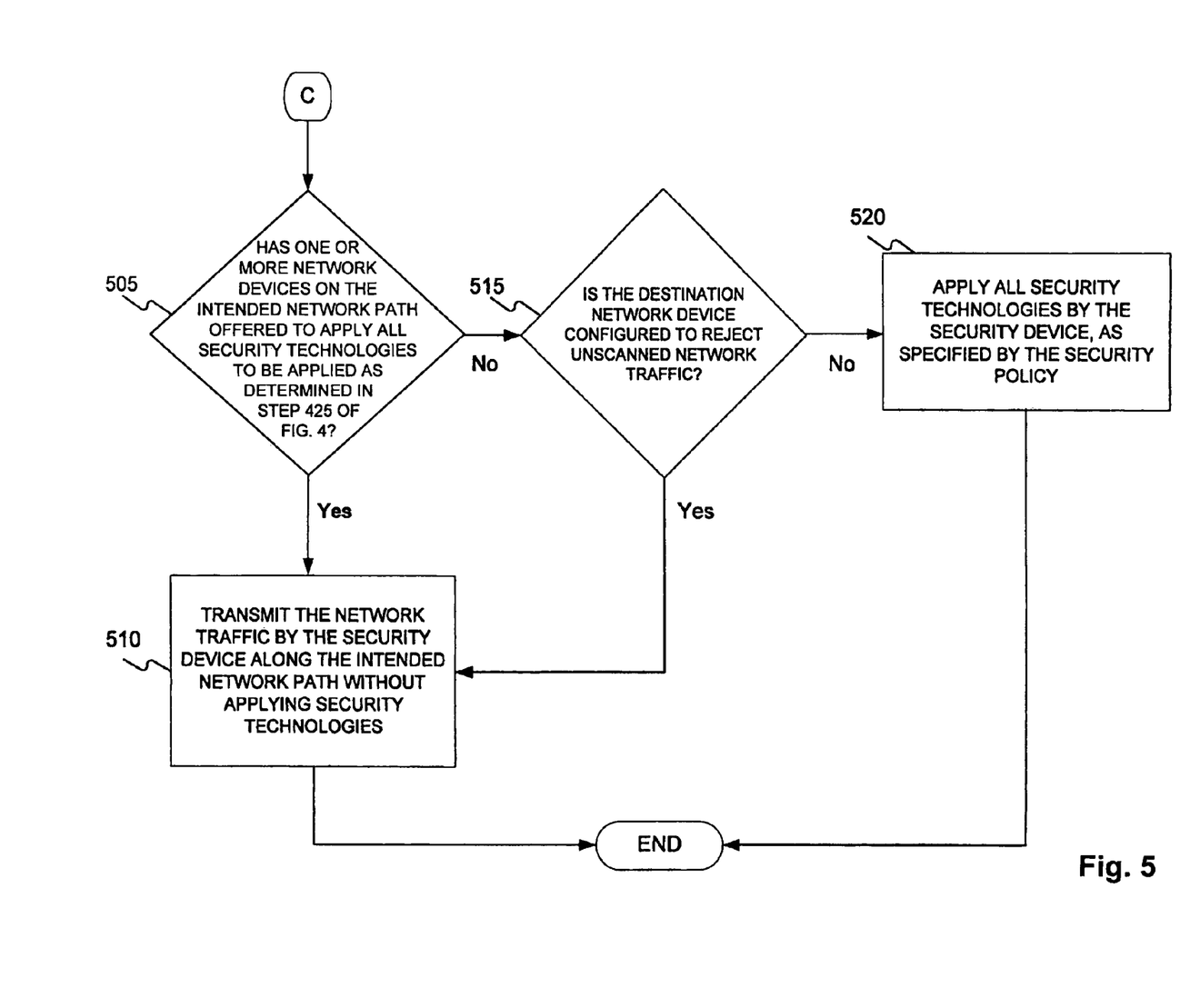

FIGS. 4 and 5 are flow diagrams of a process, consistent with the invention, for distributing data security scanning in a network comprising multiple security devices and technologies. At the start of the process as indicated in FIG. 4, stage 410, a destination network device (e.g. FIG. 1, element 101) within a network (e.g. FIG. 1, element 160) sends a request for network traffic to a security device in the network (e.g. FIG. 1, element 180). To ensure that the request for network traffic is authentic and originated from a destination network device within the network, the security device may verify the authenticity of the request for network traffic by, for example, utilizing a public key scheme such as PKI to check the signature or the source of the request or comparing the IP address of the destination network device. The security device or the destination network device may acquire the network's security policy in stage 420, for example, upon occurrence of a specified event, such as when the destination network device requests for network traffic from outside the network. The security device or the destination network device may acquire the security policy by retrieving a copy stored in the device's memory, or by requesting a copy of the security policy from another network device on the network. To ensure that the security policy is accurate and trustworthy and that the network stream is not corrupted, the security device or another network device on the network may verify the authenticity of the security policy and the integrity of the network traffic by, for example, utilizing a public key scheme such as PKI to check the signature or the source associated with the security policy and the network traffic.

Next, in stage 425, the security device determines from the security policy what security technologies to apply to the network traffic. Examples of security technologies include AV, anti-spam, protocol anomaly detection, content filtering, and IDS. The security policy, for example, may include a list of security technologies that must or should be applied to any network traffic entering the network. After establishing what security technologies to apply to the network traffic in stage 425, the security device sends a query in stage 430 to the destination network device along an intended network path in response to the destination network device's request sent in stage 410. In one embodiment, the security device determines the nature and size of the network traffic requested by the destination network device before sending a query. To minimize the overhead of sending and transmitting queries, the security device may attempt to be frugal with when and how often the queries are sent. For example, the security device may continue to process simple hypertext transfer protocol requests and responses, even when the security device is under heavy load. However, when the security device recognizes that the requested network traffic contains a large executable file, the security device may request assistance in applying security technologies by sending out a query.

The security device sends the query on the same intended network path as the network traffic to be scanned, which ensures that the path of the query is the same as the path of the network traffic, regardless of any switches or network address translation devices that may be on the intended network path.

In one embodiment, the security device sends the query to solicit offers of assistance from the one or more network devices to assist in applying the security technologies specified in the security policy. In stage 435, any one of network devices on the intended path of the network traffic may intercept the query and add its own response, possibly volunteering to apply one or more security technologies specified in the security policy. To ensure that the offer is accurate and trustworthy and that the offer is not corrupted, the network device volunteering to apply one or more security technologies digitally signs the offer by, for example, utilizing a public key scheme such as PKI. Following stage 435, a determination is made in stage 440 regarding whether the query has reached the destination network device or whether one or more network devices on the intended network path has volunteered to apply all security technologies as specified in the security policy. Based on a negative determination made in stage 440, the any one of the network device transmits the query to the next network device on the intended network path in stage 445, and the process returns to stage 435. Alternatively, based on a positive determination made in stage 440 that either the query has reached the destination network device or one or more network devices on the intended network path has volunteered to apply all security technologies as specified in the security policy, a response is sent back to the security device in stage 450.

To ensure that the response is accurate and trustworthy and that the response is not corrupted, the network device sending the response to the security device digitally signs the offer by, for example, utilizing a public key scheme such as PKI. If the authenticity and the integrity of the response cannot be verified, such as when a digital signature for the response is invalid or cannot be found, then the security device must ignore the response and scan the traffic according to the network's security policy.

Following the successful completion of stage 450, the process continues to FIG. 5, stage 505. In stage 505, the security device determines if one or more network devices on the intended network path has volunteered to apply all security technologies as specified in the security policy. If one or more network devices on the intended network path has volunteered to apply all security technologies as specified in the security policy, then the security device transmits the network along the intended network path without applying security technologies in stage 510. Alternatively, if no network device on the intended network path has volunteered to apply all security technologies as specified in the security policy, then the process proceeds to stage 515. In stage 515, a determination is made as to whether the destination network device is configured to reject unsecured network traffic. If the determination of stage 515 is affirmative, then the process proceeds to stage 510 in which the security device transmits the network traffic along the intended network path without applying security technologies. However, if the determination of stage 515 is negative, then the process proceeds to stage 520 in which the security device applies the security technologies as specified by the security policy before transmitting the network traffic to the destination network device The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM, or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A method for data security scanning in a network, comprising:
   acquiring a security policy of a network for network traffic transmitted from outside the network to a destination network device;
   ascertaining, based on the security policy, mandatory security technologies required to be applied to the network traffic;
   determining, based on a security marker associated with the network traffic, mandatory security technologies that are not yet applied to the network traffic;
   applying, by a security device on the network, at least one mandatory security technology of the not yet applied mandatory security technologies, based on a determination that the at least one mandatory technology are available to the security device; and
   indicating with a security marker in the network traffic the at least one mandatory security technology applied to the network traffic.

2. The method of claim 1, wherein acquiring comprises acquiring a security policy of a network by a perimeter security device on the perimeter of the network.

3. The method of claim 1, wherein ascertaining further comprises:
   verifying the integrity of the security policy.

4. The method of claim 1, wherein ascertaining further comprises:
   verifying the authenticity of the security policy.

5. The method of claim 1, wherein determining comprises receiving a digitally signed security marker.

6. The method of claim 5, wherein determining comprises:
   verifying the integrity of the security marker.

7. The method of claim 6, wherein determining comprises:
   verifying the authenticity of the digital signature associated with the security marker.

8. A system for data security scanning in a network, comprising:
   means for acquiring a security policy of a network for network traffic transmitted from outside the network to a destination network device;
   means for ascertaining, based on the security policy, mandatory security technologies required to be applied to the network traffic;
   means for determining, based on a security marker associated with the network traffic, mandatory security technologies that are not yet applied to the network traffic;
   means for applying, by a security device on the network, at least one mandatory security technology of the not yet applied mandatory security technologies, based on a determination that the at least one mandatory technology are available to the security device; and
   means for indicating with a security marker in the network traffic the at least one mandatory security technology applied to the network traffic.

9. The system of claim 8, wherein the means for acquiring comprises means for acquiring a security policy of a network by a perimeter security device on the perimeter of the network.

10. The system of claim 8, wherein the means for ascertaining further comprises:
    means for verifying the integrity of the security policy.

11. The system of claim 8, wherein the means for ascertaining further comprises:
    means for verifying the authenticity of the security policy.

12. The system of claim 8, wherein the means for determining comprises means for receiving a digitally signed security marker.

13. The system of claim 12, wherein the means for determining comprises:
    means for verifying the integrity of the security marker.

14. The system of claim 13, wherein the means for determining comprises:
    means for verifying the authenticity of the digital signature associated with the security marker.

15. A system for data security scanning in a network, comprising:
    a first network device for acquiring a security policy of a network for network traffic transmitted from outside the network to a destination network device;
    a second network device for ascertaining, based on the security policy, mandatory security technologies required to be applied to the network traffic;
    a third network device for determining, based on a security marker associated with the network traffic, mandatory security technologies that are not yet applied to the network traffic; and
    a security device for applying at least one mandatory security technology of the not yet applied mandatory security technologies, based on a determination that the at least one mandatory technology are available to the security device, wherein the security device indicates with a security marker in the network traffic the at least one mandatory security technology applied to the network traffic.

16. The system of claim 15, wherein the first network device comprises a perimeter security device for acquiring a security policy of a network.

17. The system of claim 15, wherein the second network device further comprises:
a processor for verifying the integrity of the security policy.

18. The system of claim 15, wherein the means for ascertaining further comprises:
a processor for verifying the authenticity of the security policy.

19. The system of claim 15, wherein the third network device comprises a processor for receiving a digitally signed security marker.

20. The system of claim 19, wherein the third network device comprises:
a processor for verifying the integrity of the security marker.

21. The system of claim 20, wherein the third network device comprises:
a processor for verifying the authenticity of the digital signature associated with the security marker.

22. A system for data security scanning in a network, comprising:
a processor; and
a memory,
wherein the processor and the memory are configured to perform a method comprising:
acquiring a security policy of a network for network traffic transmitted from outside the network to a destination network device;
ascertaining, based on the security policy, mandatory security technologies required to be applied to the network traffic;
determining, based on a security marker associated with the network traffic, mandatory security technologies that are not yet applied to the network traffic;
applying at least one mandatory security technology of the not yet applied mandatory security technologies, based on a determination that the at least one mandatory technology are available to the processor; and
indicating with a security marker in the network traffic the at least one mandatory security technology applied to the network traffic.

23. The system of claim 22, wherein ascertaining further comprises:
verifying the integrity of the security policy.

24. The system of claim 22, wherein ascertaining further comprises:
verifying the authenticity of the security policy.

25. The system of claim 22, wherein determining comprises receiving a digitally signed security marker.

26. The system of claim 25, wherein determining comprises:
verifying the integrity of the security marker.

27. The system of claim 26, wherein determining comprises:
verifying the authenticity of the digital signature associated with the security marker.

28. A computer-readable medium containing instructions for performing a method for data security scanning in a network, the method comprising:
acquiring a security policy of a network for network traffic transmitted from outside the network to a destination network device;
ascertaining, based on the security policy, mandatory security technologies required to be applied to the network traffic;
determining, based on a security marker associated with the network traffic, mandatory security technologies that are not yet applied to the network traffic;
applying, by a security device on the network, at least one mandatory security technology of the not yet applied mandatory security technologies, based on a determination that the at least one mandatory technology are available to the security device; and
indicating with a security marker in the network traffic the at least one mandatory security technology applied to the network traffic.

29. The computer-readable medium of claim 28, wherein acquiring comprises acquiring a security policy of a network by a perimeter security device on the perimeter of the network.

30. The computer-readable medium of claim 28, wherein ascertaining further comprises:
verifying the integrity of the security policy.

31. The computer-readable medium of claim 28, wherein ascertaining further comprises:
verifying the authenticity of the security policy.

32. The computer-readable medium of claim 28, wherein determining comprises receiving a digitally signed security marker.

33. The computer-readable medium of claim 32, wherein determining comprises:
verifying the integrity of the security marker.

34. The computer-readable medium of claim 33, wherein determining comprises:
verifying the authenticity of the digital signature associated with the security marker.

35. A method for data security scanning in a network, comprising:
receiving a request from a destination network device for network traffic from outside a network;
acquiring a security policy of the network for network traffic being transmitted from outside the network to the destination network device;
ascertaining, based on the security policy, mandatory security technologies that are required to be applied to the network traffic; and
sending a query to at least one network device located on an intended path of the network traffic to the destination network device, the query soliciting an assistance offer from the at least one network device for assistance in applying the mandatory security technologies.

36. The method of claim 35, further comprising:
transmitting the network traffic, without applying security technologies, along the intended path of the network traffic to the destination device, based on a determination from the assistance offer that at least one network device has volunteered to apply the mandatory security technologies.

37. The method of claim 35, further comprising:
transmitting the network traffic, without applying security technologies, along the intended path of the network traffic to the destination device, based on a determination that the destination network device is configured to reject unsecured network traffic, wherein the unsecured network traffic is network traffic that has not been scanned with the mandatory security technologies.

38. The method of claim 35, wherein sending comprises sending the query based on a determination of the size of the network traffic.

39. The method of claim 35, wherein receiving comprises receiving by a perimeter security device on the perimeter of the network.

40. The method of claim 35, wherein ascertaining further comprises:
verifying the integrity of the security policy.

41. The method of claim 35, wherein ascertaining further comprises:
   verifying the authenticity of the security policy.
42. The method of claim 36, wherein the at least one network device digitally signs the assistance offer.
43. The method of claim 42, wherein transmitting further comprises:
   verifying the integrity of the assistance offer.
44. The method of claim 43, wherein transmitting further comprises:
   verifying the authenticity of one or more digital signatures associated with the assistance offer.
45. A system for data security scanning in a network, comprising:
   means for receiving a request from a destination network device for network traffic from outside a network;
   means for acquiring a security policy of the network for network traffic being transmitted from outside the network to the destination network device;
   means for ascertaining, based on the security policy, mandatory security technologies that are required to be applied to the network traffic; and
   means for sending a query to at least one network device located on an intended path of the network traffic to the destination network device, the query soliciting an assistance offer from the at least one network device for assistance in applying the mandatory security technologies.
46. The system of claim 45, further comprising:
   means for transmitting the network traffic, without applying security technologies, along the intended path of the network traffic to the destination device, based on a determination from the assistance offer that at least one network device has volunteered to apply the mandatory security technologies.
47. The system of claim 45, further comprising:
   means for transmitting the network traffic, without applying security technologies, along the intended path of the network traffic to the destination device, based on a determination that the destination network device is configured to reject unsecured network traffic, wherein the unsecured network traffic is network traffic that has not been scanned with the mandatory security technologies.
48. The system of claim 45, wherein the means for sending comprises means for sending the query based on a determination of the size of the network traffic.
49. The system of claim 45, wherein the means for receiving comprises means for receiving by a perimeter security device on the perimeter of the network.
50. The system of claim 45, wherein the means for ascertaining further comprises:
   means for verifying the integrity of the security policy.
51. The system of claim 45, wherein the means for ascertaining further comprises:
   means for verifying the authenticity of the security policy.
52. The system of claim 46, wherein the at least one network device digitally signs the assistance offer.
53. The system of claim 52, wherein the means for transmitting further comprises:
   means for verifying the integrity of the assistance offer.
54. The system of claim 53, wherein the means for transmitting further comprises:
   means for verifying the authenticity of one or more digital signatures associated with the assistance offer.
55. A system for data security scanning in a network, comprising:
   a processor; and
   a memory,
   wherein the processor and the memory are configured to perform a method comprising:
   receiving a request from a destination network device for network traffic from outside a network;
   acquiring a security policy of the network for network traffic being transmitted from outside the network to the destination network device;
   ascertaining, based on the security policy, mandatory security technologies that are required to be applied to the network traffic; and
   sending a query to at least one network device located on an intended path of the network traffic to the destination network device, the query soliciting an assistance offer from the at least one network device for assistance in applying the mandatory security technologies.
56. The system of claim 55, wherein the processor and the memory are further configured to perform the method comprising:
   transmitting the network traffic, without applying security technologies, along the intended path of the network traffic to the destination device, based on a determination from the assistance offer that at least one network device has volunteered to apply the mandatory security technologies.
57. The system of claim 55, wherein the processor and the memory are further configured to perform the method comprising:
   transmitting the network traffic, without applying security technologies, along the intended path of the network traffic to the destination device, based on a determination that the destination network device is configured to reject unsecured network traffic, wherein the unsecured network traffic is network traffic that has not been scanned with the mandatory security technologies.
58. The system of claim 55, wherein sending comprises sending the query based on a determination of the size of the network traffic.
59. The system of claim 55, wherein ascertaining further comprises:
   verifying the integrity of the security policy.
60. The system of claim 55, wherein ascertaining further comprises:
   verifying the authenticity of the security policy.
61. The system of claim 56, wherein the at least one network device digitally signs the assistance offer.
62. The system of claim 61, wherein transmitting further comprises:
   verifying the integrity of the assistance offer.
63. The system of claim 62, wherein transmitting further comprises:
   verifying the authenticity of one or more digital signatures associated with the assistance offer.
64. A computer-readable medium containing instructions for performing a method for data security scanning in a network, the method comprising:
   receiving a request from a destination network device for network traffic from outside a network;
   acquiring a security policy of the network for network traffic being transmitted from outside the network to the destination network device;
   ascertaining, based on the security policy, mandatory security technologies that are required to be applied to the network traffic; and
   sending a query to at least one network device located on an intended path of the network traffic to the destination network device, the query soliciting an assistance offer from the at least one network device for assistance in applying the mandatory security technologies.

65. The computer-readable medium of claim 64, wherein the method further comprises:

transmitting the network traffic, without applying security technologies, along the intended path of the network traffic to the destination device, based on a determination from the assistance offer that at least one network device has volunteered to apply the mandatory security technologies.

66. The computer-readable medium of claim 64, wherein the method further comprises:

transmitting the network traffic, without applying security technologies, along the intended path of the network traffic to the destination device, based on a determination that the destination network device is configured to reject unsecured network traffic, wherein the unsecured network traffic is network traffic that has not been scanned with the mandatory security technologies.

67. The computer-readable medium of claim 64, wherein sending comprises sending the query based on a determination of the size of the network traffic.

68. The computer-readable medium of claim 64, wherein receiving comprises receiving by a perimeter security device on the perimeter of the network.

69. The computer-readable medium of claim 64, wherein ascertaining further comprises:

verifying the integrity of the security policy.

70. The computer-readable medium of claim 64, wherein ascertaining further comprises:

verifying the authenticity of the security policy.

71. The computer-readable medium of claim 65, wherein the at least one network device digitally signs the assistance offer.

72. The computer-readable medium of claim 71, wherein transmitting further comprises:

verifying the integrity of the assistance offer.

73. The computer-readable medium of claim 72, wherein transmitting further comprises:

verifying the authenticity of one or more digital signatures associated with the assistance offer.

\* \* \* \* \*

UNITED STATES PATENT AND TRADEMARK OFFICE
CERTIFICATE OF CORRECTION

| | | |
|---|---|---|
| PATENT NO. | : 7,620,974 B2 | Page 1 of 1 |
| APPLICATION NO. | : 11/034161 | |
| DATED | : November 17, 2009 | |
| INVENTOR(S) | : Newstadt et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 892 days Delete the phrase "by 892 days" and insert -- by 1317 days --

Signed and Sealed this

Twentieth Day of April, 2010

David J. Kappos
*Director of the United States Patent and Trademark Office*